UNITED STATES PATENT OFFICE.

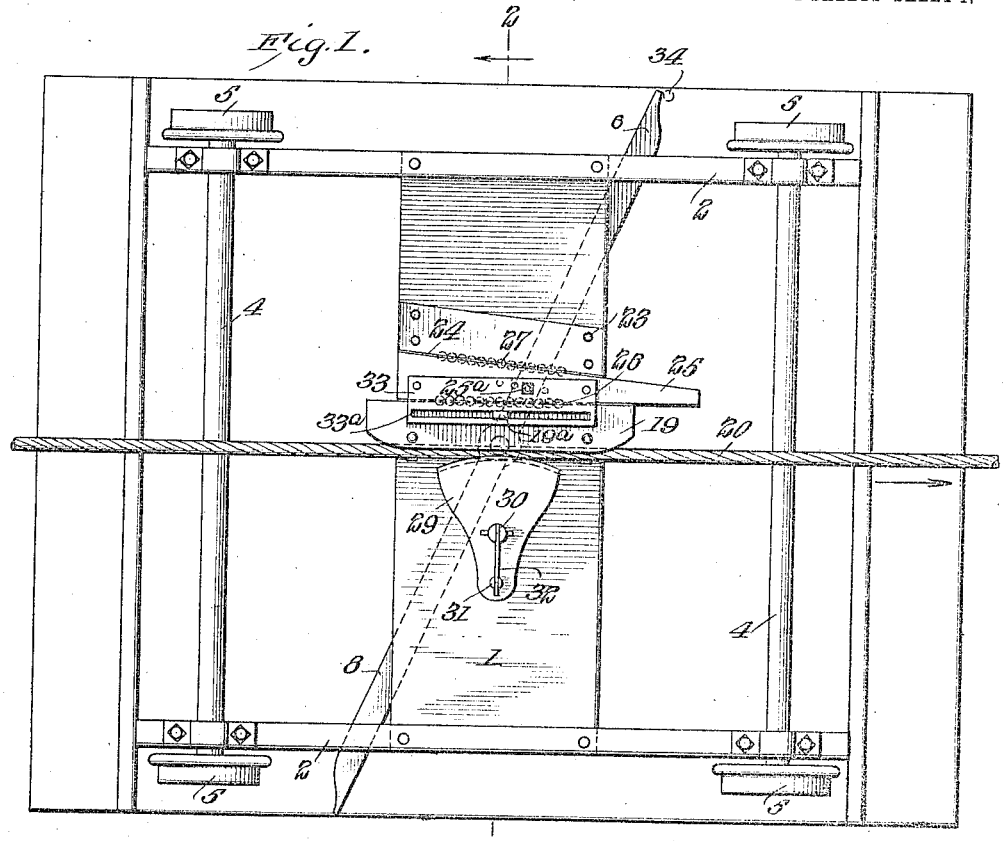

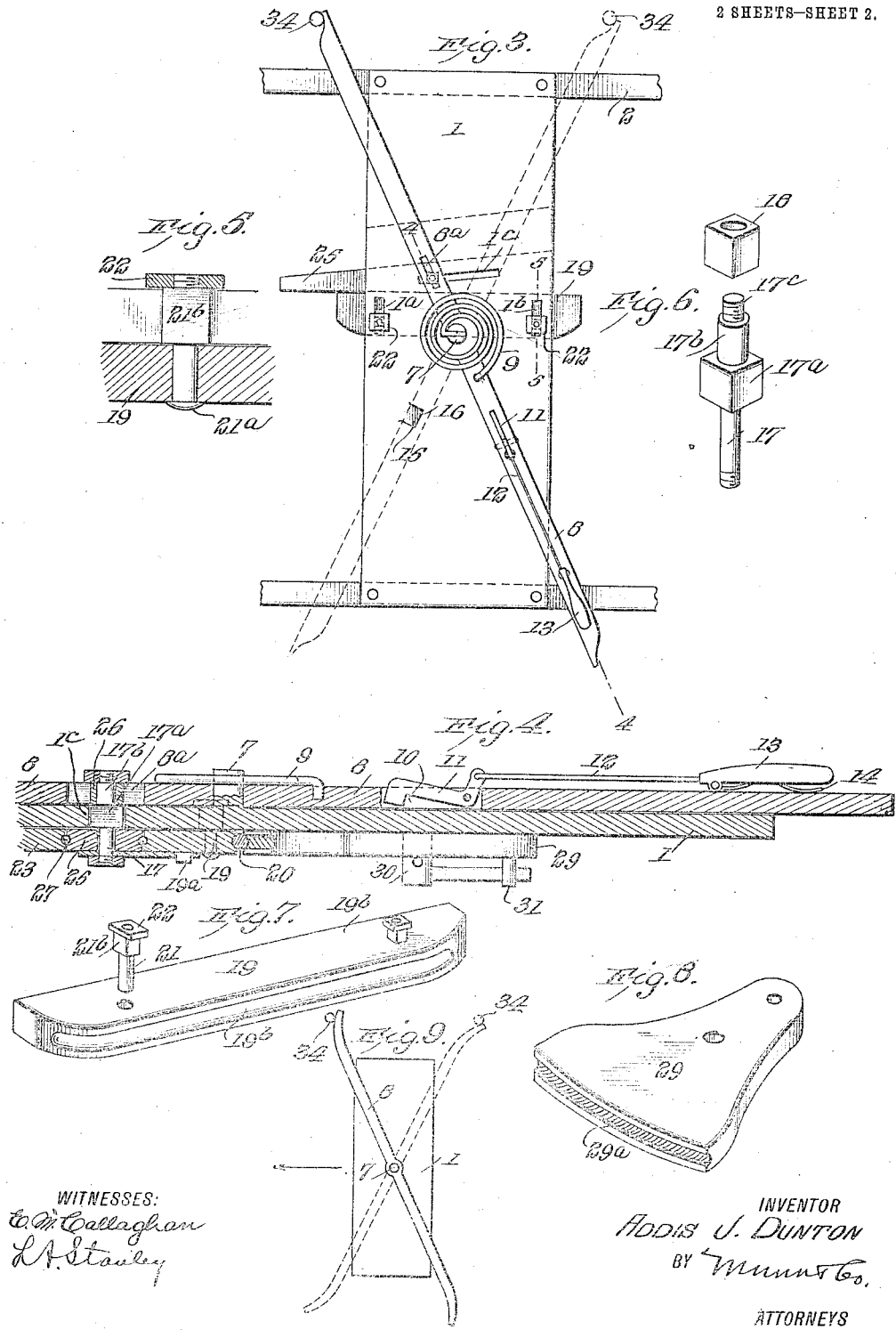

ADDIS J. DUNTON, OF KETCHIKAN, DISTRICT OF ALASKA, ASSIGNOR OF ONE-HALF TO CLEMENS J. CLEMENSSON, OF KETCHIKAN, DISTRICT OF ALASKA.

AUTOMATIC CLUTCH AND RELEASING MECHANISM FOR CABLES.

972,685.  Specification of Letters Patent. Patented Oct. 11, 1910.

Application filed July 22, 1910. Serial No. 573,193.

*To all whom it may concern:*

Be it known that I, ADDIS J. DUNTON, a citizen of the United States, and a resident of Ketchikan, District of Alaska, have invented certain new and useful Improvements in Automatic Clutch and Releasing Mechanism for Cables, of which the following is a specification.

My invention relates to improvements in devices for clutching and releasing power cables, and it consists in the constructions, arrangements and combinations herein described and claimed.

The object of my invention is to provide a device which, when set in motion, will automatically grip a traveling cable, so as to permit the cable to draw the car or other movable body to which the grip member is attached.

A further object of my invention is to provide a combined automatic gripping and releasing mechanism, so that the cable may be gripped or released as desired.

A further object of my invention is to provide a gripping member which will positively hold the cable whether it is going in one direction, or in the opposite, the gripping mechanism being so constructed that the greater the pull on the cable, the tighter the gripping member will clutch the cable. I attain this object by means of an eccentrically mounted gripping member.

A further object of my invention is to provide a powerful movable grip member, which may be readily operated by spring means, so that the cable may be engaged between this gripping member and the aforesaid eccentrically mounted member.

Other objects and advantages will appear in the following specification, and the novel features of the device will be particularly pointed out in the appended claims.

In the following specification, I will describe my device as being applied to a car, but it is obvious that it may be applied to any traveling body which is to be drawn by a traveling cable, such as the bucket of an aerial tram-way, a surface car, an elevator, etc.

My invention is illustrated in the accompanying drawings forming part of this application, in which similar reference characters indicate like parts in the several views, and in which—

Figure 1 is a bottom view of a car, showing my invention applied thereto. Fig. 2 is a section on the line 2—2, of Fig. 1, looking in the direction of the arrows. Fig. 3 is a top view of the cable clutch. Fig. 4 is a section along the line 4—4, of Fig. 3. Fig. 5 is an enlarged detail sectional view of guide bolts of the slidable grip member. Fig. 6 is a perspective view of the bolt connecting the actuating lever with the slidable wedge member. Fig. 7 is a perspective view of the slidable grip member. Fig. 8 is a perspective view of the eccentric grip member, and, Fig. 9 is a view of a modified form of actuating lever.

In carrying out my invention, I provide a main bed plate 1. In this particular instance, I have shown this bed plate as being attached to the supporting frame 2 of a car 3. The latter is provided with the usual axles 4 bearing wheels 5, which are designed to run on a track 6.

Mounted upon a pivot 7 carried by the bed plate 1, is a lever 8. This lever is provided with a spring (in this instance a spiral spring) 9, one end of which is fastened to the lever, and the other end being secured to the pivot pin 7. The lever is provided with a slot 10 (see Fig. 4), for the reception of a pivoted locking member 11. The latter is connected by means of a link 12 with a pivoted handle 13. The handle is kept in a raised position by means of the spring 14. The end of the locking member 11 is designed to enter a recess 15 in the bed plate 1. This recess, as will be seen from Fig. 3, forms a shoulder 16, against which the locking member 11 may be engaged. The bottom of the recess slopes from the shoulder to the surface of the bed plate, so that the lever may be swung past the recess 15 in one direction, but will not return unless the handle 13 is pressed to raise the locking member 11 out of the recess.

The lever 8 is provided with a longitudinal slot $8^a$, through which extends a bolt 17. This bolt is of the shape shown in Fig. 6. From this figure it will be seen that the bolt is provided with an enlarged portion $17^a$ of cubical shape, an enlarged portion $17^b$ of cylindrical shape, and a threaded portion $17^c$ arranged to receive a nut 18.

The plate 1 is provided with two longitudinal slots $1^a$ and $1^b$ near its sides, and with a diagonal slot $1^c$. On the face of the bed plate opposite that on which the lever is pivoted, I arrange a slidable grip member 19 of the shape shown in Fig. 7. This is provided with a groove 19$^a$ for the reception of the cable 20. The member 19 is slidably secured to the bed plate 1 by means of the bolts 21. These bolts extend into the slidable grip member 19 and are riveted thereto on one side as shown at 21$^a$ in Fig. 5. The bolts are provided with squared portions 21$^b$, which fit in the slots 1$^a$ and 1$^b$ in the bed plate 1, and the bolts are held in place by means of nuts 22. The construction described permits the member 19 to slide longitudinally of the bed plate 1, while maintaining positions parallel to its original position at all times.

Secured to the bed plate on the same side thereof as the slidable grip member 19, is an abutment member 23. One edge 24 of this abutment member is inclined to the straight edge 19$^b$ of the slidable grip member and between the abutment member 23 and the grip 19, is a wedge 25, which is slidable transversely of the bed plate 1. Inspection of Fig. 4 will show that the bolt 17 passes through an opening 25$^a$. The cubical portion 17$^a$ of the bolt fits in the slot 1$^c$ in the bed plate 1, while the portion 17$^b$ of the bolt passes through an opening in a block 26. The latter slides in the block 8$^a$ of the lever 8. In order to reduce the friction between the sides of the wedge 25 and the abutment member 23 on one side, I may groove these members and insert the ball bearings 27, while the ball bearings 28 may be inserted between the wedge 25 and the slidable grip member 19.

The element which coöperates with the slidable grip member 19 to cause the gripping of the rope, is best shown in Fig. 8. This member 29 is pivotally mounted on a pin 30. One end bears a slotted stud 31 arranged to receive a spring 32. The bearing edge of the member 29 is curved as shown in Fig. 8, and is provided with a corrugated groove 29$^a$. The curve is a segment of a circle, having a greater radius than the distance from its central portion to the pivot pin. It is therefore apparent that no matter which way the grip member 29 moves, its gripping surface approaches that of its companion grip member 19. The spring 32 tends to maintain the member 29 in the position shown in Fig. 1.

In order that the gripping member 19 may be retracted by a movement of the wedge 25, I provide a metal plate 33, which is secured to the wedge 25 by rivets, or otherwise. This plate has a slot 33$^a$, in which a guide lug 19$^c$ on the plate 19 runs.

From the foregoing description of the various parts of the device, the operation thereof will be readily understood.

The invention is primarily designed to be used as stated before on tram-ways having power cables which are traveling constantly. Such a cable is shown in Fig. 1. In this figure, the lever 8 is shown in the position it will assume when the gripping device clutches the cable. The spiral spring 9 tends to force the lever into the position shown in the figure. The wedge 25 is therefore forced between the abutment member 23 and the slidable grip member 19, thereby forcing the latter downwardly and clamping the rope between it and the member 29. It will be seen that a pull on the rope will tend to crowd the eccentric member 29 against the grip member 19, thereby causing it to grip the rope still tighter, and this will occur whether the rope is moving in one direction or the other, since a movement of the member 29 about its pivot will cause it to grip the rope more tightly. In order to release the cable, I may provide trip pins, such as those shown at 34. These pins extend normally in the path of the lever 8, and if the car is proceeding in the direction shown by the large arrow in Fig. 1, the lever 8 will engage the pin 34 and will therefore be swung around into the dotted line position shown in Fig. 3. (It will be borne in mind that the Fig. 1 shows the bottom of the car, and Fig. 3 shows the top of the gripping device.) When the lever 8 reaches the dotted line position shown in Fig. 3, the locking member 11 will engage the shoulder 16 of the recess 15. The movement of the lever from the full line position shown in Fig. 3, to the dotted line position, against the tension of the spiral spring 9, causes an outward movement of the wedge from between the abutment member 23 and the slidable member 19 and the latter is drawn from the cable, thereby releasing its clutch on the same. The gripping device will remain therefore inert until the handle 13 is pressed, when the locking member 11 will be withdrawn from the groove 15, and the spring 9 will bring the lever back into its original position, thereby moving the slidable grip member and causing it to grip the rope.

It will be seen that the lever 8 is designed to be tripped by the engagement with the pin 34, and to be locked in its shifted position after passing the pin. In order to facilitate the passing of the pin, I may curve the levers, as shown in Fig. 9. This, on account of the curvature of the lever, will require a shorter time for the engagement of the pin, since it is obvious that with the lever curved, it will leave the pin sooner than if it were straight.

I claim:

1. In an automatic cable gripping and releasing device, a bed plate provided with parallel longitudinal slots, and a transverse slot, a slotted lever pivotally mounted on said bed plate, a spring having one end connected with said lever, and the other end with said pivot, a locking device carried by said lever and adapted to lock the same to said bed plate against the tension of said spring, means for retracting said locking device to free the lever, an abutment carried by said bed plate on the opposite side from said lever, a slidable gripping member, means guided in the parallel slots in said bed plate for securing said gripping member to said bed plate, a movable wedge disposed between said abutment member and said slidable gripping member, a pin carried by said wedge and extending through the slot in said lever, and through the slot in said bed plate, and a pivoted grip member arranged to coöperate with said slidable grip member, said pivoted grip member having a curved gripping surface eccentric of the pivot.

2. In an automatic cable gripping and releasing device, a slotted bed plate, a slotted lever pivotally mounted on said bed plate, a spring for maintaining the lever in a given position relative to said bed plate, means for locking said lever to said bed plate, an abutment carried by said bed plate on the opposite side of said lever, a slidable gripping member, means for guiding said gripping member, a movable wedge between said abutment member and said slidable gripping member, means connected with said lever for moving said wedge, and a pivoted gripping member arranged to coöperate with said slidable gripping member, said pivoted gripping member having a curved gripping surface eccentric of the pivot.

3. In an automatic cable gripping and releasing device, a bed plate, a slidable gripping member, and an abutment member carried by said bed plate, a movable wedge between said slidable gripping member and said abutment, means securing said gripping member to said wedge, a spring actuated pivoted lever on the opposite side of the bed plate, means connected with said lever for moving said wedge, and a pivoted eccentric gripping member arranged to coöperate with said slidable gripping member.

4. In an automatic cable gripping and releasing device, a bed plate, a spring-actuated lever pivoted on said bed plate, a slidable gripping member carried by said bed plate on the opposite side from said pivoted lever, an abutment member, a movable wedge arranged between said abutment member and said slidable gripping member, means connected with said lever for moving said wedge and an opposing gripping member for coöperating with said slidable gripping member.

5. In an automatic cable gripping and releasing device, a bed plate having an abutment member, a slidable gripping member, a wedge between said abutment member and said slidable gripping member, a spring-actuated lever for moving said wedge, means coöperating with said sliding gripping member for gripping a cable, a series of pins adapted to engage said lever for operating said wedge, and automatic means for locking said lever to said bed plate.

6. In an automatic cable gripping and releasing device, a plate, an abutment carried thereby, a slidable gripping member, a second gripping member arranged to coöperate with said slidable gripping member, a wedge between said abutment and said slidable gripping member for forcing the latter toward the second-named gripping member, and means for moving said wedge.

ADDIS J. DUNTON.

Witnesses:
L. A. STANLEY,
SOLON C. KEMON.